United States Patent [19]

Burns et al.

[11] 4,213,704

[45] Jul. 22, 1980

[54] METHOD AND APPARATUS FOR SENSING THE POSITION OF A WRITING LASER BEAM

[75] Inventors: Richard H. Burns, Glendale; Kenneth Crabtree, Saugus, both of Calif.

[73] Assignee: The Singer Company, Stamford, Conn.

[21] Appl. No.: 862,247

[22] Filed: Dec. 19, 1977

[51] Int. Cl.$^2$ ............................................. G01B 9/02
[52] U.S. Cl. ................................. 356/349; 356/356; 356/152; 219/121 L
[58] Field of Search ............... 356/356, 349, 152, 153; 219/121 L

[56] References Cited

U.S. PATENT DOCUMENTS

| | | | |
|---|---|---|---|
| 3,902,036 | 8/1975 | Zaleckas | 219/121 L |
| 3,930,734 | 1/1976 | Holly | 356/356 |

OTHER PUBLICATIONS

Farmer, W. M.; and J. O. Hornkohl, "Two-Component, Self-Aligning Laser Vector Velocimeter," 12 Applied Optics 2636, Nov. 1973.

Primary Examiner—Conrad J. Clark
Attorney, Agent, or Firm—Robert E. Smith; Charles R. Lewis; Edward L. Bell

[57] ABSTRACT

A system for sensing the position of a laser writing beam is provided wherein at least two laser beams of unlike frequency are superimposed on the laser writing beam. The combined laser beams are simultaneously deflected in a common optical deflection system. Once deflected, the unlike frequency laser beams are separated from the writing laser beam and focused onto a diffraction grating. The position of the focused beams of unlike frequency on the diffraction grating corresponds to the position of the writing laser beam on the writing media. The focused laser beams of unlike frequency produce a traveling interference pattern on the grating and are diffracted by the grating into a plurality of beams. By sensing the frequency of at least one of the beams diffracted by the grating, the position and movement of the writing laser beam can be determined.

13 Claims, 4 Drawing Figures

METHOD AND APPARATUS FOR SENSING THE POSITION OF A WRITING LASER BEAM

BACKGROUND OF THE INVENTION

I. Field of Invention

The subject invention relates to laser beam recording and display systems and more particularly to laser beam recording and display systems wherein a closed feedback loop is utilized to accurately determine the position and movement of the writing laser beam.

II. Description of Prior Art

Typical laser beam writing and recording systems are described in U.S. Pat. No. 3,961,334 and copending U.S. application entitled "Method and Apparatus for Recording and Projecting Images" filed Oct. 14, 1977 and having Ser. No. 842,142 the contents of which are incorporated herein by reference. As laser beam recording and display systems become more sophisticated and complex it becomes more desirable and even necessary that the position of the laser writing beam be more accurately controlled. The basic type of laser beam position sensors are absolute and incremental. An absolute sensor indicates the true absolute position of the writing beam at any instant in time whereas an incremental sensor only detects the relative movement of the beam from one resolution element to an adjacent element. Incremental position sensing systems generally have the advantage of requiring simpler optics than absolute systems. They are also more easily expandable. Since the full address of each resolution element is not stored on location as it is in an absolute system, the resolution elements in an incremental system require less space thereby enabling greater resolution to be obtained in the same space.

An incremental, beam position monitoring system is described in the article entitled "Interference Position Monitoring System Employing Ronchi Gratings" by D. P. Jablonswski in the publication Review of Scientific Instruments, Volume 47, no. 1, January 1976 pages 96 through 100. In the system described a distributed interference pattern is utilized to determine the movement of the writing laser beam along the X axis and the Y axis. This is accomplished by utilizing, in addition to the laser writing beam, three additional laser beams having the same frequency but unlike polarization. The operation of the system is such that when the writing laser beam is stationary there is a constant D.C. output. The D.C. output requires that the sensing electronic be DC coupled rather than AC coupled. Sensing electronics that are AC coupled provide a simpler design that is more economical and more immune to laser power shifts and variation of system transmission than that obtainable with DC coupled electronics. Additionally, due to the polarized beams that are utilized, the system requires polarization separators and multiple detectors that add to the cost and complexity of the system. Further, the use of polarized beams for sensing does not enable the use of polarized beams for other functions such as a pointer as is described in the identified application.

Accordingly, one object of this invention is to provide an improved incremental system for sensing the position of a laser writing beam in a laser recording and display system.

Another object of this invention is to provide an improved laser beam recording and display system wherein the writing laser beam sensing means provides a time varying output even when the laser writing beam is stationary.

A further object of this invention is to provide means for sensing the position of a laser beam that enables AC coupled electronics to be used in the position sensing means.

Still another object of this invention is to provide an incremental laser beam position sensing system that is simpler than that heretofore obtainable in the prior art and which is therefore more reliable and economical.

SUMMARY OF THE INVENTION

Briefly described these and other objects and advantages of the present invention are obtained in an incremental laser beam position sensing system wherein a reference laser beam is diffracted into at least two beams of unlike frequency and superimposed on the writing laser beam. The superimposed laser beams are identically deflected and focused in an optical deflection system in a predetermined manner. Once deflected and focused the laser beams of unlike frequency are separated from the writing laser beam and focused onto a diffraction grating to produce a traveling interference pattern thereon. A plurality of diffracted beams emanate from the grating. Suitable sensing means, such as photo detectors, sense the frequency of at least one of the diffracted beams emanating from the grating to enable the position of the writing laser beam to be determined.

More specifically, a photo detector can sense the frequency of one of the diffracted beams emanating from the grating to enable the movement of the writing laser beam in a first direction to be determined while an additional photo detector senses the frequency of another one of the diffracted beams emanating from the grating to enable the movement of the writing laser beam in a second direction perpendicular to the first direction to be determined. The reference laser beam is diffracted into at least two beams of different frequency by an acoustic-optic frequency shifter such as a Bragg cell. Sensing the movement writing laser beam in the first direction and the second direction is accomplished by utilizing a two-axis acoustic-optic frequency shifter and a two-axis grating.

BRIEF DESCRIPTION OF THE DRAWINGS

The present invention will be readily understood from the following detailed description when taken in conjunction with the following drawings wherein like reference numerals designate like or corresponding parts throughout the several views and wherein.

DESCRIPTION OF THE PREFERRED EMBODIMENT

Figure 1:
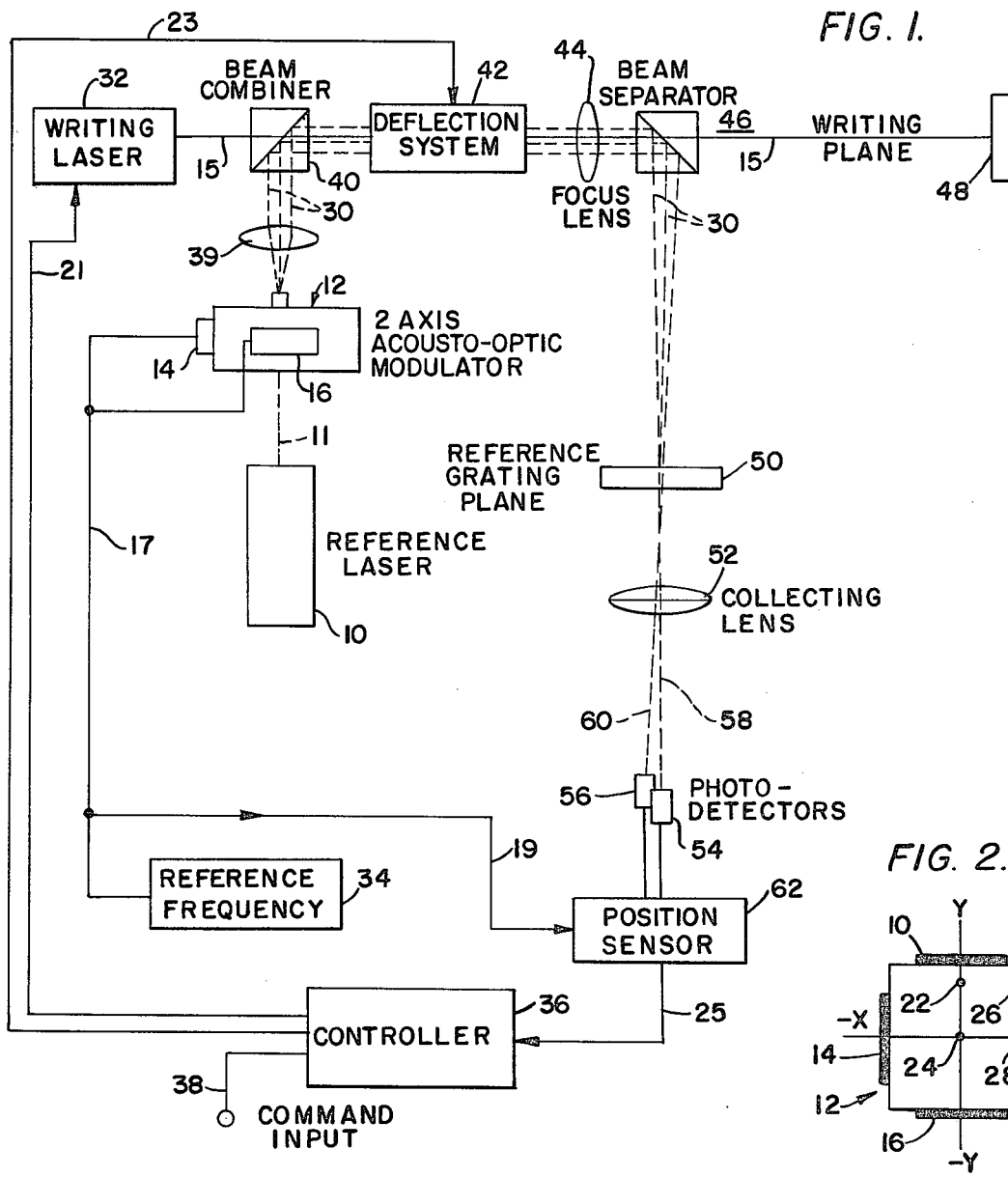
FIG. 1 is a simplified schematic illustration of the optical components and principles of the present invention as utilized in a closed loop system.

Referring now to FIG. 1 the system of the present invention is shown as including a writing laser 32 which may include a pulsed Argon laser that provides green laser radiation 15 at wave lengths of 488 and 514.5 nanometers. The writing laser 32 is turned on and off and otherwise controlled by a controller 36 by way of a lead 21. The writing laser beam 15 passes through a dichroic beam combiner 40 which includes two prisms having a number of optical layers on the mating surfaces thereof. Dichroic beam combiners are described in the U.S. Pat. No. 3,961,334 and the application incorporated herein by reference and identified hereinabove. Briefly described, however, the beam combiner 40 functions to pass therethrough beams of a particular frequency such as the writing laser beam 15 and to reflect laser beams applied thereto of a different frequency such as a laser beam 11 from a reference laser 10.

After passing through the beam combiner 40, the writing laser beam 15 is applied to an optical deflection system 42. The deflection system typically includes a servo controlled X axis mirror (not shown) and a servo controlled Y axis mirror (not shown). A relay lens is generally located between the X axis mirror and the Y axis mirror as described in the incorporated U.S. Pat. No. 3,961,334 and the above identified patent application. The writing laser beam 15 is deflected by the deflection system 42 in a predetermined manner under the control of the controller 36 by way of leads 23. The desired position or movement of the writing laser beam is entered into the controller 36 by input commands applied to the input leads 38. After passing through the deflection system 42, the writing laser beam 15 is focused by the lens 44 onto a writing plane 48. A record media (not shown) may be located at the writing plan 48 to record thereon the writing laser beam generated images. Additionally, the image formed on the writing plans 48 may be viewed directly.

Figure 2:
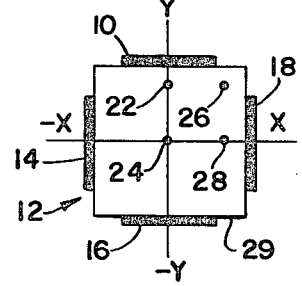
FIG. 2 schematically illustrates an acoustic-optic frequency shifter which may be utilized with the present invention.

In accordance with the present invention an incremental, closed loop, feed back system is provided that enables the movement and position of the writing laser beam 15 to be accurately determined such that the controller 36 can control the position of the writing laser beam 15 in accordance with the input commands appearing on the input leads 38. Although the present invention is described in conjunction with a closed loop system, the beam position sensing system according to the present invention functions equally well in an open loop system. A reference laser 10 which may include a Helium Neon laser provides red laser radiation 11 at a wavelength of 632.8 nanometers. The reference laser 10 is normally on and the reference laser beam 11 is applied to a two-axis acoustic-optic frequency shifter 12 which may include a two-axis Bragg cell. As illustrated in FIGS. 1 and 2, the frequency shifter 12 includes a flat, four sided glass or quartz member 29. A transducer 14 is applied to one edge of the glass 29 at the X axis and a sound absorber 18 is applied to the opposite side of the glass 29. Another transducer 16 is applied to an edge of the glass 29 along the Y axis and another sound absorber 20 is located on the opposite side thereof as is illustrated in FIG. 2. The two-axis acoustic-optic frequency shifter 12 utilized in the present invention was obtained from the Intra Action Company of Bensenville, Ill.

Each of the transducers 14 and 16 are coupled to a reference frequency source 34 by way of a lead 17. In accordance with the present invention the reference frequency 34 included a crystal controlled oscillator (not shown) having a frequency of 40 megahertz. The electrical oscillations supplied to the transducers 14 and 16 set up acoustic traveling waves of varying pressure within the glass 29 along the X and Y axis. The reference laser beam 11 is directed through the frequency shifter 12 in a direction substantially perpendicular to the plane of the glass plate 29. The traveling waves within the glass 29 diffract the reference laser beam 11 into at least three slightly divergent beams which are illustrated in FIG. 2. The beams 22, 24, 26 and 28 illustrated in FIG. 2 are shown in a plane located above and parallel to the surface of the glass plate 29. A first beam 24 that is not diffracted is produced at the cross over point of the X and Y axis and has a frequency which is equal to the frequency of the reference laser beam 11. A second beam 28 is produced along the X axis which, since it is offset from the Y axis in the direction of travel of the traveling waves along the X axis, has a frequency which is equal to the sum of the frequency of the reference laser 10 and the reference frequency 34. If the beam 28 were located on the opposite side of the Y axis, the beam 28 would have a frequency which is equal to the frequency of the reference laser 10 minus the frequency of the reference frequency 34. A third beam 22 is located along the Y axis and above the X axis is produced and has a frequency equal to the frequency of the reference laser 10 plus the frequency of the reference frequency 34. If the beam were located on the opposite side of the X axis, its frequency would be equal to the frequency of the reference laser 10 minus the frequency of the reference frequency 34. A fourth beam 26 is produced which is located between the positive Y and X axis and has a frequency which is equal to the frequency of the reference laser 10 plus twice the frequency of the reference frequency 34. If the beam 26 were located in the negative X and Y axis quadrant of the glass plate 29 its frequency would be equal to the reference laser frequency 10 minus twice the frequency of the reference frequency 34. In addition to the four beams 22, 24, 26, 28 which are illustrated in FIG. 2, other higher order frequency beams are present in the remaining quadrants of the plane located above the glass plate 29. However, by adjusting the angle of incidence of the frequency shifter 12, these other beams are greatly reduced in amplitude and for purposes of understanding the present system can be considered being non-existent. Of the four beams 22, 24, 26 and 28 only beams 22 and 28 have the same frequency.

The four diffracted beams leaving the frequency shifter 12 are illustrated in the system shown in FIG. 1 as the dashed lines 30. After leaving the frequency shifter 12, the diffracted laser beams 30 are focused by a lens 39 onto the first deflection mirror (not shown) within the deflection system 42. Before entering the deflection system 42, however, the diffracted beams 30 enter the beam combiner 40 where they are reflected and superimposed upon the writing laser beam 15. The deflection system 42 will identically deflect the writing laser beam 15 and the diffracted laser beams 30. After being deflected, the superimposed laser beams 15 and 30 are focused by the focusing lens 44. The lens 44 is designed in a well known manner to provide the same focal length for both the diffracted laser beams 30 and the writing laser beam 15 even though they are not of the same frequency. After leaving the focusing lens 44, the superimposed beams 15 and 30 enter a beam separator 46. The optical characteristics of the beam separator 46 are substantially identical to the optical characteristics of the beam combiner 40. The writing laser beam 15 passes through the beam separator 46 on its way to the writing plane 48. The diffracted laser beams 30, however, are reflected by the beam separator 46 onto a reference grating plane 50 which is located at the focal point of the diffracted beams 30.

Figure 3:
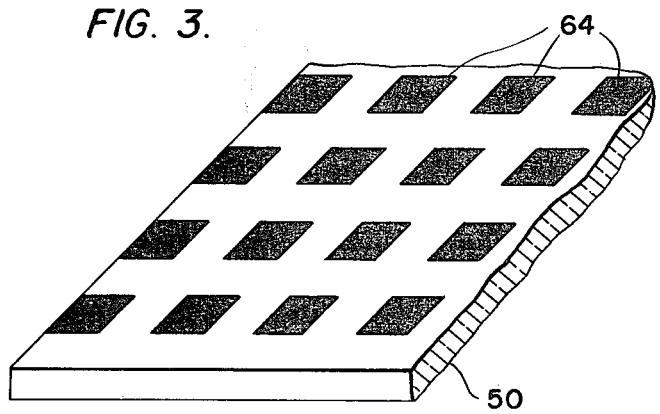
FIG. 3 illustrates a portion of a two-axis diffraction grating which may be utilized with the present invention.

The diffracted beams 30 are focused on the reference grating plane 50 and create a broad spot thereon that contains a traveling interference pattern. The writing plane 48 is located the same distance from the focus lens 44 as the reference grating plane 50 such that the movement of the focused, diffracted beams 30 on the reference grating plane 50 corresponds substantially identically to the movement of the writing laser beam 15 on the writing plane 48. As illustrated in FIG. 3, the reference grating plane 50 may comprise a two-axis Ronchi grating that may include a flat, square, glass or quartz plate 59. The two perpendicular axis of the grating are illustrated in FIG. 3 wherein the two perpendicular axis are delineated by the square elements 64. In accordance with one embodiment of the present invention which was constructed, the squares 64 constituted vacuum deposited thin layers of a suitable material such as chromium having dimensions of 0.001 inch square with a 0.001 inch separation therebetween. The pattern of glass 59 and squares 64 illustrated in FIG. 3 may also be the reverse of that illustrated.

Figure 4:
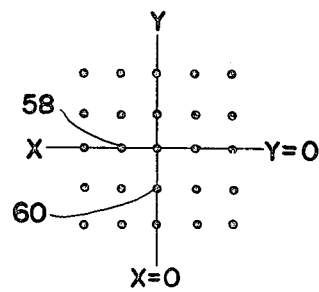
FIG. 4 illustrates an idealized pattern of diffracted beams which are obtained from the diffraction grating utilized in the present invention and illustrated in FIG. 3.

The diffracted beams 30 focused on the grating 50 are diffracted by the grating 50 into a plurality of beams. FIG. 4 is an idealized representation of the diffracted beams produced by the grating 50 along a plane substantially parallel to the plane of the grating 50. Unlike that shown in FIG. 4, however, the position of the various beams need not be symetrical about the X and Y axis. The diffracted beams pass through a collecting lens 52 which separate the X and Y beams. The traveling interference pattern on the reference grating caused by the diffracted beams 30 being focused thereon interacts with the grating 50 to modulate the energy of the diffracted beams produced by the grating 50. This causes at least one of the diffracted beams, such as beam 60, to be modulated only in accordance with the motion of the writing laser beam 15 along the X axis whereas the modulation of another beam, such as beam 58, is modulated only in accordance with the motion of the writing laser beam 15 along the Y axis. For purposes of simplicity, only the diffracted beams 58 and 60 are illustrated in FIG. 1 as emanating from the reference grating plane 50. By placing a suitable detecting element, such as a photo detector 54, in the path of the diffracted beam 58, a signal can be derived the frequency of which is indicative of the movement of the writing beam 50 along the Y axis. For example, when there is no movement of the writing laser beam 15 along the Y axis the frequency of the diffracted beam 58 detected by the photo detector 54 will be equal to the frequency of the reference frequency 34. However, if the writing laser beam 15 and therefore the diffracted beams 30 are moved in a direction along the Y axis that is in the same direction as the traveling interference pattern on the reference grating 50 the frequency detected at the photo detector 54 will increase. However, if the movement of the writing laser beam 15 along the Y axis is in the opposite direction, the frequency detected by the photo detector 54 will be less than the frequency of the reference frequency 34. In like manner by placing a suitable sensing element, such as a photo detector 56, in the path of the diffracted beam 60 a signal frequency is derived that is indicative of the motion of the writing laser beam 15 along the X axis. The combination of the focus lens 44 and the collecting lens 52 forms an imaging system so that the exit pupil of the deflection system is imaged onto each detector 54 and 56. This image is fixed in space even though the point of impingement on the reference grating 50 moves as the beams 15 and 30 are deflected. Accordingly, a particular diffraction order from the grating 50 will always hit the proper detector 54 or 56. The frequency detected by the photo detectors 54 and 56 due to the detection system 42 deflecting the superimposed beams 15 and 30 is determined by the size and spacing of the squares 64 on the reference grating 50 and the velocity of movement imparted to the beams 30 and 15 by the deflection system 42.

In accordance with a preferred embodiment of the present invention the photo detectors 54 and 56 constituted high speed silicon detectors. Additionally, the beams 58 and 60 can be directed to the photo detectors 54 and 56 by way of light pipes, if desired. As is apparent from the description above, when the writing beam 15 is stationary the photo detectors produce an output frequency.

The frequency signals from the photo detectors 54 and 56 are applied to a position sensor 62 which also has as an input the output from the reference frequency 34. In accordance with one embodiment of the present invention which was constructed the position sensor 62 included an up down counter (not shown) coupled to the frequency signal output from the photo detector 54 and another up down counter (not shown) coupled to the frequency signal output of the photo detector 56. Each up down counter is connected to the output of the reference frequency 34. Each up down counter was utilized to convert the detector 56 and 54 output signals applied thereto to an incremental beam position for the X and Y axis, respectively. For example, the up down counter associated with the X axis will count up at the frequency of the associated photo detector 56 output and simultaneously count down at the frequency of the reference frequency 34. Accordingly, motion along the X axis in the direction of the traveling fringe pattern on the reference grating 50 will cause the counter to show a net increase in value while motion opposite to the direction of travel of the traveling interference pattern along the X axis on the grating 50 will cause the counter to show a net decrease in value. When the deflection system 42 is stationary, the counter will remain at a value that indicates the present position of the writing laser beam 15 along the X axis. The position and movement of the writing laser beam 15 along the Y axis is determined in a like manner.

The count in the counters which is indicative of the position of the writing laser beam 15 in the X and Y axis is applied to the controller 36 by way of the leads 25. By comparing the actual position of the laser writing beam with the desired command input positions, the controller 36 can make the necessary corrective inputs to the deflection system 42 to accurately position the writing laser beam 15. As will be apparent to those skilled in the art, the controller may take many forms such as microprocessor controlled system, a dedicated computer, logic circuits and the like. In any event, a detailed description of the controller 36 is not required to understand the present invention and it is not part of the invention claimed.

As will be apparent from the above, as the controller 36 causes the deflection system 42 to deflect the writing laser beam 15 in a desired manner across the writing plane 48 in response to commands applied to the controller 36, the output from the two photo detectors 54 and 56 enable the position sensor 62 to provide the controller 36 with accurate information with regard to the actual position of the writing laser beam 15 on the writing plane 48. This allows the controller 36 to take the necessary actions to cause the deflection system 42 to properly position the writing laser beam 15 to the desired location. As will be apparent, the writing laser beam 15 need not be on when sensed position information is being applied to the controller 36. For example, it may be desired to move the writing laser beam 15 to a desired position of the writing plane 48 before writing is to commence. to accomplish this the controller 36 has the writing laser 32 in an off condition. By means of the position signals provided by the position sensor 62, the controller 36 can direct the diffracted beams 30 to a location on the reference grating plane 50 which corresponds to the desired location of the writing laser beam 15 on the writing plane 48 before turning the writing laser 32 on.

The system of the present invention enables the position sensor 62 to provide an output that is indicative of the movement of the writing laser beam 15 position at the writing plane 48. However, in order to know where the writing laser beam 15 is at any time it is necessary to know where the writing laser beam 15 started i.e. there must be a known reference position from which the count in the up down counters indicates the movement therefrom. This can readily be accomplished by manually or automatically adjusting the deflection system such that the diffracted beams 30 are focused on the reference grating plane 50 at a predetermined spot or location which is the reference position. Any movement from the reference position will be sensed by a change in the up down counters within the position sensor 62 in a manner as discussed hereinabove. In this manner the controller 36 is always provided with accurate data concerning the movement and the position of the writing beam 15 with respect to the writing plane 48 regardless of whether the writing laser 32 is on or off.

What is claimed is:

1. The method of sensing the positon of a deflected laser beam comprising:
   providing a first laser beam the position of which is to be sensed,
   diffracting a second laser beam into at least two beams of unlike frequency by means of a single input frequency,
   combining said first laser beam and said laser beams of unlike frequency,
   simultaneously passing said combined laser beams through a deflection system to deflect said combined laser beams,
   separating said deflected laser beams of unlike frequency from said deflected first laser beam,
   focusing said separated laser beams of unlike frequency onto a diffraction grating to produce a traveling interference pattern thereon whereby a plurality of diffracted beams emanate from said grating, and
   sensing the frequency of at least one of said diffracted beams emanating from said grating to enable the movement of said first laser beam in a first direction to be determined, and
   sensing the frequency of another one of said diffracted beams emanating from said grating to enable the movement of said first laser beam in a second direction perpendicular to said first direction to be determined.

2. The method according to claim 1 wherein:
   the step of focusing said laser beams of unlike frequency onto the grating takes place prior to separating the laser beams of unlike frequency from said deflected first laser beam.

3. The method according to claim 1 wherein:
   the step of focusing the beams of unlike frequency also includes focusing said deflected first laser beam.

4. The method according to claim 1 further including the step of
   focusing said laser beams of unlike frequency onto a deflecting mirror in said deflection system prior to the combining of said laser beams of unlike frequency with said first laser beam.

5. Apparatus for sensing the position of a deflected laser beam comprising:
   a first laser beam the position of which is to be sensed,
   a second laser beam,
   means for diffracting said second laser beam into at least two beams of unlike frequency,
   said means for diffracting said second laser beam into two beams includes an acoustic-optic frequency shifter having a single frequency input,
   means for combining said first laser beam and said laser beams of unlike frequency,
   a deflection system in the path of said combined beams to deflect said combined laser beams in a predetermined manner,
   means for separating said deflected laser beams of unlike frequency from said deflected first laser beam,
   means for focusing said laser beams of unlike frequency onto a diffraction grating to produce a traveling interference pattern thereon whereby a plurality of diffracted beams emanate from said grating, and
   means for sensing the frequency of at least one of said diffracted beams emanating from said grating for enabling the movement of said first laser beam in a first direction to be determined, and
   additional means for sensing the frequency of another one of said diffracted beams emanating from said grating for enabling the movement of said first laser beam in a second direction perpendicular to said first direction to be determined.

6. The apparatus according to claim 5 wherein:
   said means for focusing the beams of unlike frequency also focuses said deflected first laser beam.

7. The apparatus according to claim 5 further including:
   means for focusing said laser beams of unlike frequency into said deflecting means prior to the combining of said laser beams of unlike frequency with said first laser beam.

8. The apparatus according to claim 6 wherein said acoustic-optic frequency shifter includes a Bragg Cell.

9. The apparatus according to claim 5 wherein:
   said means for diffracting said second laser beam into at least two beams of unlike frequency includes a two axis acoustic-optic frequency shifter.

10. The apparatus according to claim 9 further including:

an electrical oscillator having its output coupled to each axis of said two axis frequency shifter.

11. The apparatus according to claim 5 wherein said means for diffracting said second laser beam produces a laser beam having a frequency equal to said second laser beam and two laser beams having a frequency that differs from the frequency of the second laser beam by substantially the frequency of said oscillator.

12. The apparatus according to claim 5 wherein said means for sensing the frequency of at least one of said diffracted beams emanating from said grating includes a photodetector.

13. The apparatus according to claim 11 wherein said diffraction grating includes a two-axis grating.

* * * * *